(12) United States Patent
Sakamoto

(10) Patent No.: US 11,366,009 B2
(45) Date of Patent: Jun. 21, 2022

(54) LIGHT DETECTION DEVICE AND LASER DEVICE

(71) Applicant: Fujikura Ltd., Tokyo (JP)

(72) Inventor: Shinichi Sakamoto, Chiba (JP)

(73) Assignee: FUJIKURA LTD., Tokyo (JP)

( * ) Notice: Subject to any disclaimer, the term of this patent is extended or adjusted under 35 U.S.C. 154(b) by 176 days.

(21) Appl. No.: 16/754,932

(22) PCT Filed: Oct. 9, 2018

(86) PCT No.: PCT/JP2018/037552
§ 371 (c)(1),
(2) Date: Apr. 9, 2020

(87) PCT Pub. No.: WO2019/073957
PCT Pub. Date: Apr. 18, 2019

(65) Prior Publication Data
US 2020/0292383 A1    Sep. 17, 2020

(30) Foreign Application Priority Data

Oct. 10, 2017   (JP) ................................ 2017-197261

(51) Int. Cl.
*G01J 1/42*     (2006.01)
*G01J 1/04*     (2006.01)
(Continued)

(52) U.S. Cl.
CPC .......... *G01J 1/4257* (2013.01); *G01J 1/0425* (2013.01); *H01S 3/06708* (2013.01); *G02B 6/02042* (2013.01)

(58) Field of Classification Search
CPC ... G01J 1/0425; G01J 1/4257; H01S 3/06708; G02B 6/02042
See application file for complete search history.

(56) References Cited

U.S. PATENT DOCUMENTS

2013/0087694 A1   4/2013   Creeden et al.
2014/0313513 A1   10/2014  Liao
(Continued)

FOREIGN PATENT DOCUMENTS

CN    103998963 A    8/2014
CN    105720463 A    6/2016
(Continued)

OTHER PUBLICATIONS

Extended European Search Report issued in the counterpart European Patent Application No. 18866219.1, dated Jun. 18, 2021 (10 pages).

*Primary Examiner* — Kevin K Pyo
(74) *Attorney, Agent, or Firm* — Osha Bergman Watanabe & Burton LLP

(57) ABSTRACT

A light detection device includes: a first optical fiber including a first core surrounded by a first cladding; a second optical fiber including a second core surrounded by a second cladding; a first cladding mode stripper provided outside the first cladding; a first light detector; and a second light detector. The second core has a diameter larger than a diameter of the first core and is connected to the first core. In a longitudinal direction of the first optical fiber, the first light detector is disposed on one side of the first cladding mode stripper and the second light detector is disposed on another side of the first cladding mode stripper.

12 Claims, 2 Drawing Sheets

(51) Int. Cl.
    *H01S 3/067*      (2006.01)
    *G02B 6/02*       (2006.01)

(56)            References Cited

U.S. PATENT DOCUMENTS

2016/0359289 A1    12/2016  Kashiwagi
2018/0059343 A1     3/2018  Kliner
2021/0181015 A1*    6/2021  Sakamoto ............ G02B 6/4286

FOREIGN PATENT DOCUMENTS

CN        105723576 A      6/2016
GB          2021806 A     12/1979
JP        S61-130831 A     6/1986
JP        2008216577 A     9/2008
JP          5260885 B2     8/2013
JP         2016-76598 A    5/2016
JP        2016143739 A     8/2016
JP        2017-518482 A    7/2017
JP        2017-183622 A   10/2017
WO       2012/073952 A1    6/2012
WO        2012165389 A1   12/2012
WO       2014/035505 A2    3/2014

* cited by examiner

LIGHT DETECTION DEVICE AND LASER DEVICE

TECHNICAL FIELD

The present invention relates to a light detection device, and a laser device including the light detection device.

BACKGROUND

A fiber laser device is used in various fields, such as a laser processing field and a medical field, as it has excellent light condensing performance and high power density, and can obtain light as a small beam spot. In order to achieve favorable processing quality using such a highly efficient laser device, it is required to accurately detect intensity of light propagating through an optical fiber.

For example, Patent Literature 1 set out below discloses a fiber laser device capable of estimating intensity of light propagating through an optical fiber by detecting light leaking from a connection between optical fibers. In addition, Patent Literature 2 discloses a sensor unit capable of estimating intensity of light propagating through an optical fiber by detecting Rayleigh scattering of the light propagating through the optical fiber.

[Patent Literature 1] WO2012/073952 A1
[Patent Literature 2] WO2014/035505 A2

The fiber laser device disclosed in Patent Literature uses light leaked from a connection between optical fibers, and heat is generated at the time of taking out the leaked light from the optical fiber. Such heat generation becomes more pronounced as the energy of light propagating through the optical fiber increases. Therefore, in the fiber laser device disclosed in Patent Literature 1, the influence exerted by heat increases in a detector and a path to the detector as the energy of light propagating through the optical fiber increases, and linearity of the relationship between a detection result and the intensity of light propagating through the optical fiber estimated from the detection result tends to be lost. Accordingly, it becomes difficult to accurately detect the intensity of the light propagating through the optical fiber.

The sensor unit disclosed in Patent Literature 2 detects Rayleigh scattering, and Rayleigh scattering occurs in all directions, whereby it is difficult to determine in which direction of the optical fiber the light is propagating from which the Rayleigh scattering occurs. Accordingly, with the sensor unit disclosed in Patent Literature 2, it is difficult to accurately detect the intensity of light propagating through the optical fiber in a predetermined direction. In particular, since reflected light propagating in the direction opposite to the laser output direction can be generated in processing a highly reflective material, such as metal processing, it becomes difficult to accurately detect the intensity of light propagating through the optical fiber in a predetermined direction.

SUMMARY

One or more embodiments of present invention provide a light detection device that can improve detection accuracy of intensity of respective light beams bidirectionally propagating through an optical fiber, and a laser device including the light detection device.

According to one or more embodiments, a light detection device according to the present invention includes: a first optical fiber that includes a first core and first cladding surrounding the first core; a second optical fiber that includes a second core having a diameter larger than that of the first core and connected to the first core, and second cladding surrounding the second core; a first cladding mode stripper provided outside the first cladding; and a first light detection unit (first light detector) and a second light detection unit (second light detector), in which, in the longitudinal direction of the first optical fiber, the first light detection unit is disposed on one side of the first cladding mode stripper and the second light detection unit is disposed on the other side, the first light detection unit detects Rayleigh scattering of light propagating through the first optical fiber, the second light detection unit detects Rayleigh scattering of light propagating through the first optical fiber or the second optical fiber, and at least one of the first optical fiber and the second optical fiber is a multimode fiber.

In the light detection device according to one or more embodiments of the present invention, the first light detection unit detects light propagating through the first optical fiber, that is, Rayleigh scattering of light bidirectionally propagating through the first core and the first cladding. The second light detection unit detects light propagating through the first optical fiber or the second optical fiber, that is, Rayleigh scattering of light bidirectionally propagating through the first core and the first cladding or the second core and the second cladding. Furthermore, in the light detection device according to one or more embodiments of the present invention, the first core having a relatively small diameter and the second core having a relatively large diameter are connected to each other. Therefore, at least a part of the light propagating from the second core to the side of the first core is made incident on the first cladding. In addition, at least a part of the light propagating through the first cladding is emitted to the outside of the first optical fiber by the first cladding mode stripper. Therefore, in the detection results of the first light detection unit and the second light detection unit disposed to sandwich the first cladding mode stripper, there is at least a difference corresponding to the amount of the light emitted by the first cladding mode stripper. The magnitude of the difference depends on at least the intensity of light propagating from the second core to the side of the first core. Therefore, the intensity of the light propagating from the second core to the side of the first core can be estimated using the difference between the detection result of the first light detection unit and the detection result of the second light detection unit. As described above, the first light detection unit and the second light detection unit detect Rayleigh scattering of light bidirectionally propagating through the first optical fiber and the second optical fiber, respectively. Here, by estimating the intensity of light propagating from the second core toward the side of the first core as described above, it is also possible to estimate the intensity of light propagating from the first core toward the side of the second core from the detection result of the first light detection unit or the second light detection unit. Moreover, in the light detection device according to one or more embodiments of the present invention, each of the first light detection unit and the second light detection unit detects Rayleigh scattering. Therefore, compared with the case of detecting leaked light as in the fiber laser device disclosed in Patent Literature 1 mentioned above, it is possible to maintain linearity of the relationship between the detection result and the intensity of light propagating through the optical fiber estimated from the detection result even in the case where the intensity of light propagating through the optical fiber is strong. Therefore, the light detection device according to one or more embodiments the present invention can improve detection accuracy of the intensity of respective light beams bidirectionally propagating through the optical fiber.

The second optical fiber may be a multimode fiber.

With the light propagating in the multimode through at least the second core out of the first core having a relatively small diameter and the second core having a relatively large diameter, it becomes easier to make the light propagating from the second core to the side of the first core incident on the first cladding. Accordingly, it becomes easier to increase the difference between the detection result of the first light detection unit and the detection result of the second light detection unit, whereby the detection accuracy of respective light beams bidirectionally propagating through the optical fiber can be further improved.

Furthermore, in the longitudinal direction of the first optical fiber and the second optical fiber, the first light detection unit and the second light detection unit may be disposed to sandwich a connection between the first optical fiber and the second optical fiber.

As described above, the light detection device according to one or more embodiments of the present invention utilizes a difference between the detection result of the first light detection unit and the detection result of the second light detection unit, caused by removing, using the first cladding mode stripper, cladding mode light generated at the connection between the first optical fiber and the second optical fiber. Incidentally, since there is a difference in additive concentration between the cladding and the core, the ratio of Rayleigh scattering differs between light propagating through the core and light propagating through the cladding. Therefore, each of the first light detection unit and the second light detection unit may detect Rayleigh scattering of light propagating through either the core or the cladding. Here, since the second core has a relatively large diameter than the first core, the light propagating from the first core to the side of the second core propagates through the second core with the loss at the connection being suppressed. Meanwhile, at least a part of the light propagating from the second core to the side of the first core is made incident on the first cladding at the connection as described above. However, at least a part of the light incident on the first cladding in this manner is emitted to outside by the first cladding mode stripper before the first light detection unit. Accordingly, with the first light detection unit and the second light detection unit being disposed to sandwich the connection, the first light detection unit mainly detects Rayleigh scattering of the light propagating through the first core, and the second light detection unit mainly detects Rayleigh scattering of the light propagating through the second core. In this manner, each of the first light detection unit and the second light detection unit mainly detects Rayleigh scattering of light propagating through the core, whereby detection accuracy of the intensity of respective light beams bidirectionally propagating through the optical fiber can be further improved.

Furthermore, the second optical fiber may be disposed on the downstream side of the first optical fiber in the propagation direction of light from a light source that emits light to propagate through the first optical fiber and the second optical fiber.

Hereinafter, the upstream side in the propagation direction of light from the light source may be simply referred to as an upstream side, and the downstream side in the propagation direction of the light from the light source may be simply referred to as downstream side. Out of the first optical fiber and the second optical fiber connected to each other, the second optical fiber including the second core having a relatively large diameter is located on the downstream side, whereby the loss of light propagating from the upstream side to the downstream side can be suppressed.

Furthermore, a second cladding mode stripper may be provided outside the second cladding.

In a case where the cladding mode light propagating through the second cladding is not removed, at least a part of the cladding mode light propagating from the second cladding to the side of the first cladding can propagate through the first cladding. Therefore, with the second cladding mode stripper being included in the second optical fiber as described above, the cladding mode light propagating through the second cladding is reduced, and the cladding mode light propagating through the first cladding can also be reduced. Furthermore, as described above, the first light detection unit detects Rayleigh scattering of light propagating through the first core and the first cladding, and the second light detection unit detects Rayleigh scattering of light propagating through the first core and the first cladding or the second core and the second cladding. Since the cladding mode light propagating through the second cladding and the first cladding can be reduced as described above, the influence on detection results of the first light detection unit and the second light detection unit exerted by the cladding mode light is suppressed, and the intensity of light propagating through the first core or the second core can be more accurately detected. Since the degree of Rayleigh scattering differs between the light propagating through the core of the optical fiber and the cladding mode light, the cladding mode light is reduced and the Rayleigh scattering of the light propagating through the core is detected, whereby the intensity of the light propagating through the optical fiber can be more accurately detected.

Furthermore, the first light detection unit may be disposed on the side opposite to the side of the second optical fiber with respect to the first cladding mode stripper, and the second light detection unit may be disposed on the side opposite to the side of the first optical fiber with respect to the second cladding mode stripper.

With the first light detection unit, the second light detection unit, the first cladding mode stripper, and the second cladding mode stripper being disposed in this manner, at least a part of the cladding mode light propagating from the first optical fiber to the side of the second optical fiber is emitted to the outside of the second optical fiber by the second cladding mode stripper before the second light detection unit. Furthermore, at least a part of the cladding mode light propagating from the second optical fiber to the side of the first optical fiber is emitted to the outside of the first optical fiber by the first cladding mode stripper before the first light detection unit. Therefore, the first light detection unit can more accurately detect the intensity of light propagating through the first core, and the second light detection unit can more accurately detect the intensity of light propagating through the second core.

Furthermore, no dopant may be added to the first core and the second core.

With no dopant being added to the first core and the second core, occurrence of an error in the detection results of the first light detection unit and the second light detection unit due to concentration distribution of the dopant can be suppressed.

Furthermore, the first cladding may be coated with a low refractive index resin having a refractive index lower than that of the first cladding at the portion from the connection between the first optical fiber and the second optical fiber to the first cladding mode stripper.

With the first cladding being coated with the low refractive index resin in this manner, in the vicinity of the connection, leakage of the cladding mode light generated in the connection between the first optical fiber and the second optical fiber is suppressed, and the cladding mode light can propagate to the first cladding mode stripper. With the leakage of light in the vicinity of the connection being suppressed in this manner, heat generation in the vicinity of the connection is suppressed, and a change in the amount of light loss at the connection can be suppressed. Therefore, the first light detection unit and the second light detection unit can more accurately detect the light intensity.

Furthermore, the outer diameter of the first cladding and the outer diameter of the second cladding may be equal to each other.

With the outer diameters of the first cladding and the second cladding being equal to each other, at the time of fusion splicing of the first optical fiber and the second optical fiber, occurrence of a non-uniform step at the connection is suppressed, whereby occurrence of bending at the connection can be suppressed. Accordingly, light loss at the connection between the first optical fiber and the second optical fiber can be suppressed.

Furthermore, a mode scrambler that reduces an energy difference between light beams of respective modes propagating in the core of whichever is the multimode fiber out of (i.e., between) the first optical fiber and the second optical fiber may be provided.

With the mode scrambler for scattering light propagating in the core that propagates the light in a multimode being provided, a difference in energy density distribution of the light propagating in the core can be reduced. Accordingly, a difference in the amount of loss due to the angle of the propagating light can be reduced at the connection between the second core and the first core. Therefore, variation in the detection results of the first light detection unit and the second light detection unit can be suppressed.

According to one or more embodiments, the laser device includes the light detection device, and at least one light source that emits light to propagate through the first optical fiber and the second optical fiber.

As described above, with the light detection device according to one or more embodiments of the present invention, it becomes possible to improve detection accuracy of the intensity of respective light beams bidirectionally propagating through the optical fiber. Therefore, according to the laser device including the light detection device, it becomes possible to improve accuracy in control based on the intensity of light propagating through the optical fiber.

As described above, according to one or more embodiments of the present invention, there are provided a light detection device that can improve detection accuracy of intensity of respective light beams bidirectionally propagating through an optical fiber, and a laser device including the light detection device.

DETAILED DESCRIPTION

Hereinafter, embodiments of a light detection device and a laser device according to the present invention will be described in detail with reference to the accompanying drawings.

Figure 1:
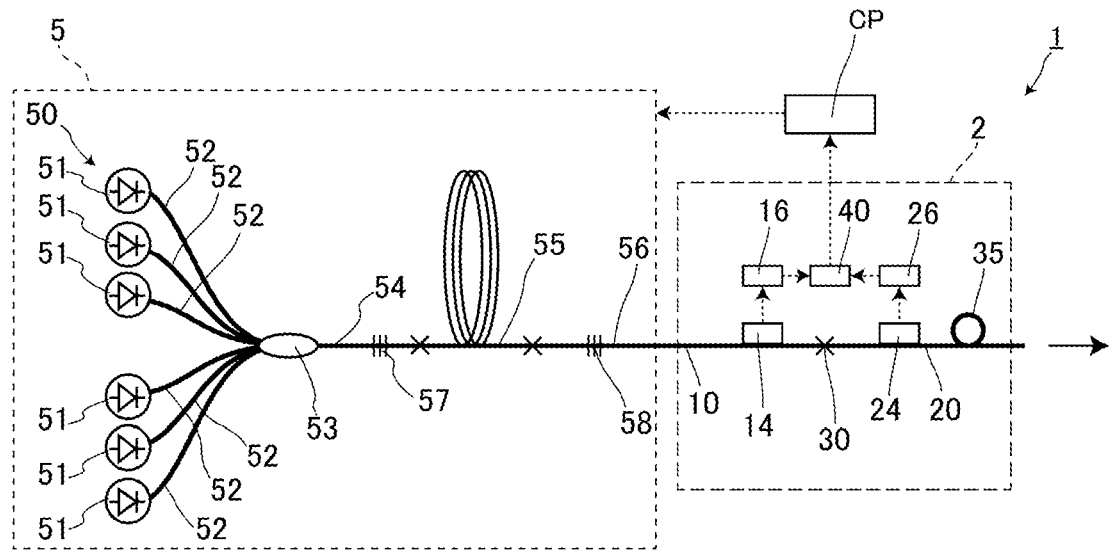
FIG. 1 is a diagram schematically illustrating a configuration of a laser device according to one or more embodiments of the present invention.

FIG. 1 is a diagram schematically illustrating a configuration of a laser device according to one or more embodiments of the present invention. As illustrated in FIG. 1, a laser device 1 according to one or more embodiments mainly includes a light detection device 2, a light source 5, and a control unit CP.

The light source 5 mainly includes a pumping light source 50, an optical combiner 53, an amplification optical fiber 55, an optical fiber 54 connected to one side of the amplification optical fiber 55, a first fiber bragg grating (FBG) 57 provided on the optical fiber 54, an optical fiber 56 connected to the other side of the amplification optical fiber 55, and a second FBG 58 provided on the optical fiber 56. The amplification optical fiber 55, the first FBG 57, and the second FBG 58 constitute a resonator.

The pumping light source 50 includes a plurality of laser diodes 51, and in one or more embodiments, the laser diodes 51 is a Fabry-Perot type semiconductor laser made of a GaAs-based semiconductor, for example, and emits pumping light having a central wavelength of 915 nm. Each of the laser diodes 51 of the pumping light source 50 is connected to the optical fiber 52, and the pumping light emitted from the laser diode 51 propagates through the optical fiber 52 as multimode light, for example.

The amplification optical fiber 55 mainly includes a core, inner cladding tightly surrounding the outer peripheral surface of the core, outer cladding coating the outer peripheral surface of the inner cladding, and a coating layer coating the outer cladding, and has what is called a double-clad structure. The refractive index of the inner cladding is set to be lower than the refractive index of the core, and the refractive index of the outer cladding is set to be lower than the refractive index of the inner cladding. Examples of a material constituting the core of the amplification optical fiber 55 include an element that increases the refractive index, such as germanium (Ge), and quartz to which an active element, such as ytterbium (Yb), to be pumped by pumping light emitted from the pumping light source 50 is added. Examples of a material constituting the inner cladding of the amplification optical fiber 55 include pure quartz to which no dopant is added. Note that an element that lowers the refractive index, such as fluorine (F), may be added to the material of the inner cladding. The outer cladding is made of resin or quartz, examples of the resin include an ultraviolet curable resin, and examples of the quartz include quartz to which a dopant, such as fluorine (F), that lowers the refractive index so that the refractive index becomes lower than that of the inner cladding, is added. Examples of a material constituting the coating layer of the amplification optical fiber 55 include an ultraviolet curable resin, and in a case where the outer cladding is made of resin, the material is an ultraviolet curable resin different from the resin constituting the outer cladding.

The optical fiber 54 connected to one side of the amplification optical fiber 55 mainly includes a core to which no active element is added, inner cladding tightly surrounding the outer peripheral surface of the core, outer cladding coating the outer peripheral surface of the inner cladding, and a coating layer coating the outer cladding. The core of the optical fiber 54 has substantially the same configuration as the core of the amplification optical fiber 55 except that no active element is added thereto. The core of the optical fiber 54 is connected to the core of the amplification optical fiber 55, and the inner cladding of the optical fiber 54 is connected to the inner cladding of the amplification optical fiber 55. The core of the optical fiber 54 is provided with the first FBG 57 serving as a first mirror. Thus, the first FBG 57 is provided on one side of the amplification optical fiber 55. In the first FBG 57, a portion in which the refractive index periodically increases is repeatedly provided along the longitudinal direction of the optical fiber 54, and this cycle is adjusted so that at least a part of the light emitted from the active element of the amplification optical fiber 55 in a pumped state, which has a certain wavelength, is reflected. The first FBG 57 has reflectivity higher than the reflectivity of the second FBG 58 to be described later, and may be equal to or more than 90% or equal to or more than 99%, of the light with a desired wavelength among the light emitted from the active element is reflected. The wavelength of the light reflected by the first FBG 57 is, for example, 1,090 nm in the case where the active element is ytterbium as described above.

The optical fiber 56 connected to the other side of the amplification optical fiber 55 mainly includes a core to which no active element is added, cladding tightly surrounding the outer peripheral surface of the core, and a coating layer coating the outer peripheral surface of the cladding. The core of the optical fiber 56 is connected to the core of the amplification optical fiber 55, and the cladding of the optical fiber 56 is connected to the inner cladding of the amplification optical fiber 55. The core of the optical fiber 56 is provided with the second FBG 58 serving as a second mirror. Thus, the second FBG 58 is provided on the other side of the amplification optical fiber 55. In the second FBG 58, a portion in which the refractive index increases is repeatedly provided at constant cycles along the longitudinal direction of the optical fiber 56, and at least a part of the light reflected by the first FBG 57, which has a certain wavelength, is reflected with reflectivity lower than that of the first FBG 57. The second FBG 58 may reflect at least a part of the light reflected by the first FBG 57 having a certain wavelength with the reflectivity of 5% to 50%, or may be with the reflectivity of 5% to 10%.

In the optical combiner 53, the core of the optical fiber 52 is connected to the inner cladding of the optical fiber 54. Accordingly, the optical fiber 52 through which the pumping light emitted from each of the laser diodes 51 propagates is optically coupled with the inner cladding of the amplification optical fiber 55 via the inner cladding of the optical fiber 54.

Figure 2:
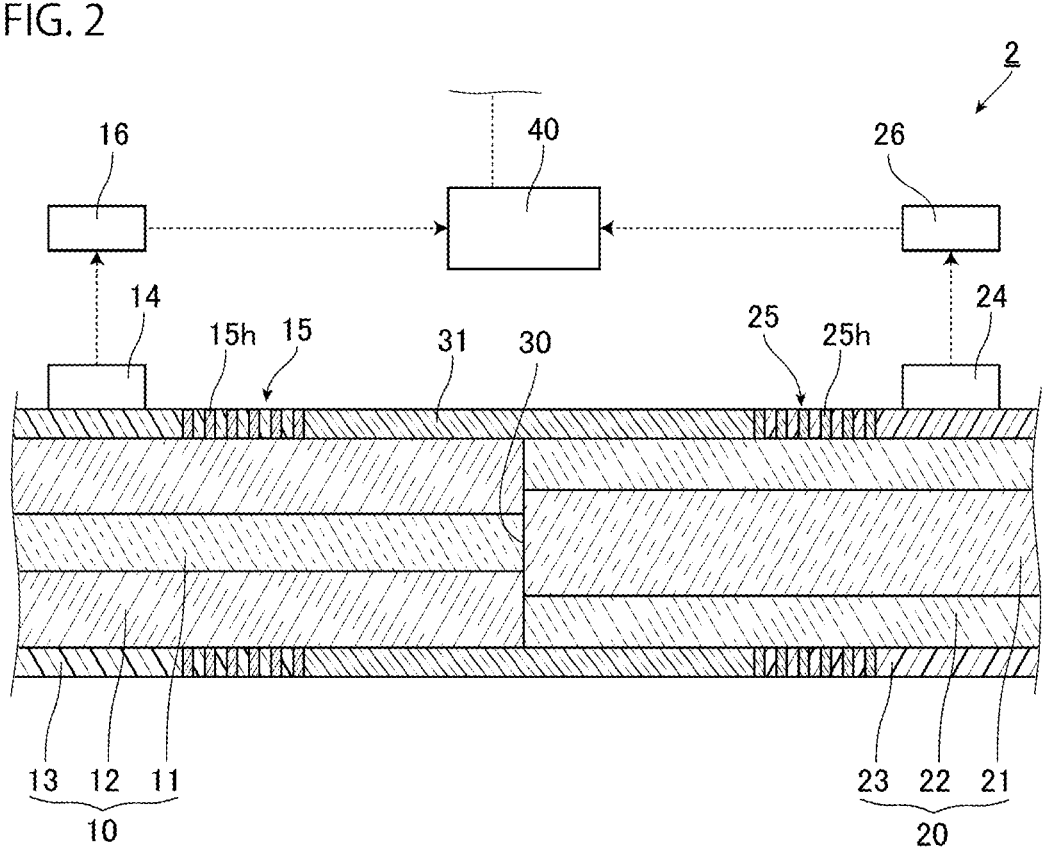
FIG. 2 is a cross-sectional view schematically illustrating a part of a light detection device illustrated in FIG. 1.

FIG. 2 is a cross-sectional view schematically illustrating a part of the light detection device 2 illustrated in FIG. 1. As illustrated in FIGS. 1 and 2, the light detection device 2 according to one or more embodiments mainly includes a first optical fiber 10, a second optical fiber 20, a low refractive index resin layer 31, a first cladding mode stripper 15, a second cladding mode stripper 25, a first light detection unit 14, a second light detection unit 24, a first AD converter 16, a second AD converter 26, a mode scrambler 35, and a calculator 40.

The first optical fiber 10 may be a part of the optical fiber 56, or may be another optical fiber connected to the optical fiber 56. The first optical fiber 10 includes a first core 11, first cladding 12 surrounding the first core 11, and a first coating layer 13 surrounding the first cladding 12. The first core 11 is made of pure quartz to which no dopant is added. The first cladding 12 is made of a material having a refractive index lower than that of the first core 11. Examples of the material constituting the first cladding 12 include quartz to which a dopant, such as fluorine (F), that lowers the refractive index is added. The first coating layer 13 is made of a material having a refractive index lower than that of the first cladding 12. Examples of the material constituting the first coating layer 13 include an ultraviolet curable resin. Such a first optical fiber 10 is, for example, an optical fiber in which the diameter of the first core 11 is approximately 80 μm and the outer diameter of the first cladding 12 is approximately 360 μm. In addition, the first optical fiber 10 according to one or more embodiments is a multimode fiber.

The first cladding mode stripper 15 is provided outside the first cladding 12 of the first optical fiber 10. The first cladding mode stripper 15 is not particularly limited as long as it is capable of emitting cladding mode light propagating through the first cladding 12 to the outside of the first optical fiber 10. The first cladding mode stripper 15 according to one or more embodiments has a configuration in which a plurality of high refractive index portions 15$h$ made of resin having a refractive index higher than that of the first cladding 12 is intermittently provided outside the first cladding 12.

The second optical fiber 20 includes a second core 21, second cladding 22 surrounding the second core 21, and a second coating layer 23 surrounding the second cladding 22. The second core 21 is made of pure quartz to which no dopant is added. The second cladding 22 is made of a material having a refractive index lower than that of the second core 21. Examples of the material constituting the second cladding 22 include quartz to which a dopant, such as fluorine (F), that lowers the refractive index is added. The second coating layer 23 is made of a material having a refractive index lower than that of the second cladding 22. Examples of the material constituting the second coating layer 23 include an ultraviolet curable resin. Such a second optical fiber 20 is, for example, an optical fiber in which the diameter of the second core 21 is approximately 100 μm and the outer diameter of the second cladding 22 is approximately 360 μm. The outer diameter of the second cladding 22 may be equal to the outer diameter of the first cladding 12. With the outer diameters of the first cladding 12 and the second cladding 22 being equal to each other, at the time of fusion splicing of the first optical fiber and the second optical fiber, occurrence of a non-uniform step at a connection is suppressed, whereby occurrence of bending at the connection can be suppressed. Accordingly, light loss at the connection between the first optical fiber 10 and the second optical fiber 20 can be suppressed. In addition, the second optical fiber 20 according to one or more embodiments is a multimode fiber.

The second cladding mode stripper 25 is provided outside the second cladding 22 of the second optical fiber 20. The second cladding mode stripper 25 is not particularly limited as long as it is capable of emitting cladding mode light propagating through the second cladding to the outside of the second optical fiber 20. The second cladding mode stripper 25 according to one or more embodiments has a configuration in which a plurality of high refractive index portions 25$h$ made of resin having a refractive index higher than that of the second cladding 22 is intermittently provided outside the second cladding 22.

The first optical fiber 10 and the second optical fiber 20 are connected to each other at one end face thereof, the first core and the second core are connected to each other, and the first cladding 12 is connected to the second cladding 22 and a part of the outer periphery of the second core 21. The connection between the first optical fiber 10 and the second optical fiber 20 is performed by, for example, end faces of each other being subject to fusion splicing using an oxyhydrogen burner or the like. Further, in the vicinity of a connection 30 between the first optical fiber 10 and the second optical fiber 20, the first coating layer 13 and the second coating layer 23 are peeled off. The portion where the first coating layer 13 and the second coating layer 23 are peeled off is coated with the low refractive index resin layer 31 in a state where the first optical fiber 10 and the second optical fiber 20 are connected. The low refractive index resin layer 31 is made of a low refractive index resin having a refractive index lower than the refractive index of the first cladding 12 and the refractive index of the second cladding 22. The low refractive index resin layer 31 according to one or more embodiments is formed between the first cladding mode stripper 15 and the second cladding mode stripper 25. That is, the first cladding 12 and the second cladding 22 are coated with the low refractive index resin layer 31 at the portion between the connection 30 and the first cladding mode stripper 15 and at the portion between the connection 30 and the second cladding mode stripper 25. Such a low refractive index resin layer 31 is made of, for example, an ultraviolet curable resin.

The mode scrambler 35 illustrated in FIG. 1 is formed on the second optical fiber 20. The mode scrambler 35 scatters light propagating through the second core 21. The second optical fiber 20 according to one or more embodiments is a multimode fiber, and the mode scrambler 35 reduces an energy difference of light beams of respective modes propagating in the second core 21. The mode scrambler 35 according to one or more embodiments is formed by a part of the second optical fiber 20 being bent in an annular shape as illustrated in FIG. 1.

In one or more embodiments, the first light detection unit 14 is disposed outside the first optical fiber 10, and detects Rayleigh scattering of light propagating through the first optical fiber 10. The second light detection unit 24 is disposed outside the second optical fiber 20, and detects Rayleigh scattering of light propagating through the second optical fiber 20. Note that, since Rayleigh scattering occurs in all directions, it is difficult to determine in which direction of the optical fiber the light is propagating from which the Rayleigh scattering occurs. For example, in the case of using a laser device for processing a highly reflective material, such as metal processing, reflected light propagating in the direction opposite to the laser output direction may also propagate through the optical fiber. In such a case, as will be described later, the light detection device 2 according to one or more embodiments can improve detection accuracy of intensity of respective light beams bidirectionally propagating through the optical fiber. The first light detection unit 14 is provided on the side opposite to the side of the second optical fiber 20 with respect to the first cladding mode stripper 15, and the second light detection unit 24 is provided on the side opposite to the side of the first optical fiber 10 with respect to the second cladding mode stripper 25. In other words, the first light detection unit 14 is disposed on the upstream side of the first cladding mode stripper 15 in the propagation direction of light from the light source 5, and the second light detection unit 24 is disposed on the downstream side of the second cladding mode stripper 25 in the propagation direction of the light from the light source 5. The first light detection unit 14 and the second light detection unit 24 may be disposed apart from the first cladding mode stripper 15 and the second cladding mode stripper 25, respectively. With the first light detection unit 14 and the second light detection unit 24 being disposed apart from the first cladding mode stripper 15 and the second cladding mode stripper 25, respectively, influence exerted by heat generated in the first cladding mode stripper 15 and the second cladding mode stripper 25 on the first light detection unit 14 and the second light detection unit 24 can be suppressed. Each of such a first light detection unit 14 and a second light detection unit 24 includes, for example, a photodiode.

The first AD converter 16 is a part that performs AD conversion on signals from the first light detection unit and transmits the signals to the calculator 40. The second AD converter 26 is a part that performs AD conversion on signals from the second light detection unit 24 and transmits the signals to the calculator 40.

The calculator 40 performs calculation based on a detection result in the first light detection unit 14 transmitted through the first AD converter 16 and a detection result in the second light detection unit 24 transmitted through the second AD converter 26 to estimate, as will be described later, intensity of light propagating through the first core 11 and intensity of light propagating through the second core 21.

The control unit CP illustrated in FIG. 1 controls, as will be described later, the light source 5 on the basis of signals from the calculator 40.

Next, operation and actions of the laser device 1 and the light detection device 2 according to one or more embodiments will be described.

First, when pumping light is emitted from each of the laser diodes 51 of the pumping light source 50, the pumping light is made incident on the inner cladding of the amplification optical fiber 55 via the inner cladding of the optical fiber 54. The pumping light incident on the inner cladding of the amplification optical fiber 55 mainly propagates through the inner cladding of the amplification optical fiber 55 and, at the time of passing through the core of the amplification optical fiber 55, pumps the active element added to the core. The active element brought into a pumped state emits spontaneous emission light having a specific wavelength. In a case where the active element is ytterbium, for example, the spontaneous emission light at this time is light having a certain wavelength band including a wavelength of 1,090 nm. The spontaneous emission light propagates through the core of the amplification optical fiber 55, a part of the light having a certain wavelength is reflected by the first FBG 57, and among the reflected light, light having a wavelength to be reflected by the second FBG 58 is reflected the second FBG 58 to reciprocate in the resonator. Then, when the light reflected by the first FBG 57 and the second FBG 58 propagates through the core of the amplification optical fiber 55, stimulated emission occurs to amplify the light, and laser oscillation occurs when the gains and losses in the resonator are equalized. A part of the light resonating between the first FBG 57 and the second FBG 58 then passes through the second FBG 58, and is emitted through the first optical fiber 10 and the second optical fiber 20.

The light propagating thorough the first optical fiber 10 and the second optical fiber 20 mainly propagates through the first core 11 and the second core 21. The light emitted from the second optical fiber 20 is emitted to a workpiece or the like. Further, a part of the light emitted to the workpiece or the like is reflected by the surface of the workpiece or the like, and a part of the reflected light may return to the second optical fiber 20. Hereinafter, the direction from the first optical fiber 10 toward the second optical fiber 20 may be referred to as a forward direction, and the direction from the second optical fiber 20 toward the first optical fiber 10 may be referred to as a reverse direction.

Since the second core 21 has a larger diameter than the first core 11, light propagating in the forward direction is made incident on the second core 21 from the first core 11 with the loss at the connection 30 being suppressed. Therefore, assuming that the intensity of light propagating through the first core 11 in the forward direction is Pf and the intensity of light propagating through the second core 21 in the reverse direction is Pr while ignoring the loss of the light propagating through the first core 11 in the forward direction at the connection 30, light intensity M2 obtained from Rayleigh scattering detected by the second light detection unit 24 can be expressed by the following formula (1).

$$M2 = Pf + Pr \quad (1)$$

Meanwhile, since the second core 21 has a larger diameter than the first core 11, at least a part of the light propagating through the second core 21 in the reverse direction is made incident on the first cladding 12 at the connection 30 to be cladding mode light. Further, at least a part of the cladding mode light, which is made incident on the first cladding 12 and propagates through the first cladding 12, is emitted outside the first optical fiber by the first cladding mode stripper 15. Therefore, the light incident on the first core 11 from the second core 21 is a part of the light propagating through the second core 21 in the reverse direction. Assuming that the proportion of the light incident on the first core 11 out of the light propagating through the second core 21 in the reverse direction is $\alpha$, light intensity M1 obtained from Rayleigh scattering detected by the first light detection unit 14 can be expressed by the following formula (2). That is, the intensity of light propagating through the first core 11 in the reverse direction can be set to $\alpha$Pr.

$$M1 = Pf + \alpha Pr \quad (2)$$

The detection results in the first light detection unit 14 and the second light detection unit 24 are input to the calculator 40 via the first AD converter 16 and the second AD converter 26, and the calculator 40 carries out calculation using the formulae (1) and (2) mentioned above. Furthermore, from the formulae (1) and (2) mentioned above, the intensity Pf of light propagating through the first core 11 in the forward direction and the intensity Pr of light propagating through the second core 21 in the reverse direction can be obtained as the following formulae (3) and (4).

$$Pr = (M2 - M1)/(1 - \alpha) \quad (3)$$

$$Pf = (\alpha M2 - M1)/(\alpha - 1) \quad (4)$$

Note that "$\alpha$" in the above formulae can be calculated from the ratio between the diameters of the first core 11 and the second core 21. For example, in a case where the ratio between the diameters of the first core 11 and the second core 21 is 1:2, the area ratio between end faces of the first core 11 and the second core 21 is 1:4, and thus a can be set to 1/4.

Furthermore, in the case of considering the connection loss of bidirectionally propagating light at the connection between the first core 11 and the second core 21, the light intensity M1 obtained from Rayleigh scattering detected by the first light detection unit 14 and the light intensity M2 obtained from Rayleigh scattering detected by the second light detection unit 24 can be expressed by the following formulae (5) and (6), respectively. Here, $\beta$ represents the proportion of light propagating through the first core 11 in the forward direction, which is made incident on the second core 21 and reaches the position to be detected by the second light detection unit 24, and $\gamma$ represents the proportion of light propagating through the second core 21 in the reverse direction, which is made incident on the first core 11 and reaches the position to be detected by the first light detection unit 14. That is, the intensity of light propagating through the first core in the reverse direction can be set to $\gamma$Pr, and the intensity of light propagating through the second core 21 in the forward direction can be set to $\beta$Pf.

$$M1 = Pf + \gamma Pr \quad (5)$$

$$M2 = \beta Pf + Pr \quad (6)$$

From the formulae (5) and (6) mentioned above, the intensity Pf of light propagating through the first core 11 in the forward direction and the intensity Pr of light propagating through the second core 21 in the reverse direction can be obtained as the following formulae (7) and (8).

$$Pr = (\gamma M2 - M1)/(\gamma \beta - 1) \quad (7)$$

$$Pf = (\beta M1 - M2)/(\gamma \beta - 1) \quad (8)$$

Note that $\beta$ and $\gamma$ in the above formulae can be obtained in advance by performing a test of propagating light through the first optical fiber 10 and the second optical fiber 20 in the forward direction and the reverse direction. Specifically, first, the first optical fiber 10 and the second optical fiber 20 are connected, and a calorimeter for measuring the energy of light emitted from the downstream end face of the second optical fiber 20 is disposed. Then, light is propagated in the forward direction from the upstream side of the first optical fiber 10, and the ratio between the energy of the light incident on the first optical fiber 10 and the energy measured by the calorimeter can be set to $\beta$. Furthermore, the first optical fiber 10 and the second optical fiber 20 are connected, and a calorimeter for measuring the energy of light emitted from the upstream end face of the first optical fiber 10 is disposed. Then, light is propagated in the reverse direction from the downstream side of the second optical fiber 20, and the ratio between the energy of the light incident on the second optical fiber 20 and the energy measured by the calorimeter can be set to $\gamma$. Note that, in a case where the ratio between the diameter of the first core 11 and the diameter of the second core 21 is known, only one of $\beta$ and $\gamma$ may be obtained as described above, and the other one can be obtained using the ratio between the diameter of the first core 11 and the diameter of the second core 21. For example, in a case where the ratio between the diameters of the first core 11 and the second core 21 is 1:2, the area ratio between end faces of the first core 11 and the second core 21 is 1:4, and thus it can be set to $\beta:\gamma = 1:1/4$.

After the intensity Pf of light in the forward direction and the intensity Pr of light in the reverse direction are obtained by the calculator 40 as described above, the control unit CP can perform predetermined control on the laser device 1 on the basis of the calculation result. For example, control can be performed to adjust output from the light source 5 according to the intensity Pf of light in the forward direction, or to stop laser light emitted from the laser device 1 in the case where the intensity Pf of light in the reverse direction exceeds a permissible value.

As described above, in the light detection device 2 according to one or more embodiments, the first light detection unit 14 detects light propagating through the first optical fiber 10, that is, Rayleigh scattering of light bidirectionally propagating through the first core 11 and the first cladding 12. In addition, the second light detection unit 24 detects light propagating through the second optical fiber 20, that is, Rayleigh scattering of light bidirectionally propagating through the second core 21 and the second cladding 22. Furthermore, in the light detection device 2 according to one or more embodiments, the first core 11 having a relatively small diameter and the second core 21 having a relatively large diameter are connected to each other. Therefore, at least a part of the light propagating from the second core 21 to the side of the first core 11 is made incident on the first cladding 12. In addition, at least a part of the light propagating through the first cladding 12 is emitted to the outside of the first optical fiber 10 by the first cladding mode stripper 15. Therefore, in the detection results of the first light detection unit 14 and the second light detection unit 24 disposed to sandwich the first cladding mode stripper, there is at least a difference corresponding to the amount of the light emitted by the first cladding mode stripper 15. The magnitude of the difference depends on at least the intensity of light propagating from the second core 21 to the side of the first core 11. Therefore, the intensity of the light propagating from the second core 21 to the side of the first core 11 can be estimated using the difference between the detection result of the first light detection unit 14 and the detection result of the second light detection unit 24. As described above, the first light detection unit 14 and the second light detection unit 24 detect Rayleigh scattering of light bidirectionally propagating through the first optical fiber 10 and the second optical fiber 20, respectively. Here, by estimating the intensity of light propagating from the second core 21 toward the side of the first core 11 as described above, it is also possible to estimate the intensity of light propagating from the first core 11 toward the side of the second core 21 from the detection result of the first light detection unit 14 or the second light detection unit 24. Moreover, in the light detection device 2 according to one or more embodiments, each of the first light detection unit 14 and the second light detection unit 24 detects Rayleigh scattering. Therefore, compared with the case of detecting leaked light as in the fiber laser device disclosed in Patent Literature 1 mentioned above, it is possible to maintain linearity of the relationship between the detection result and the intensity of light propagating through the optical fiber estimated from the detection result even in the case where the intensity of light propagating through the optical fiber is strong. Therefore, the light detection device 2 according to one or more embodiments can improve detection accuracy of the intensity of respective light beams bidirectionally propagating through the optical fiber.

Furthermore, in the light detection device 2 according to one or more embodiments, the second optical fiber 20 is located on the downstream side of the first optical fiber 10 in the propagation direction of light from the light source 5. Out of the first optical fiber 10 and the second optical fiber 20 connected to each other, the second optical fiber 20 including the second core 21 having a relatively large diameter is located on the downstream side, whereby the loss of light propagating from the upstream side to the downstream side can be suppressed. In other words, the loss of light propagating in the forward direction can be suppressed.

Furthermore, in the light detection device 2 according to one or more embodiments, the first light detection unit 14 is disposed on the upstream side of the first cladding mode stripper 15 in the propagation direction of the light from the light source 5, and the second light detection unit 24 is disposed on the downstream side of the second cladding mode stripper 25 in the propagation direction of the light from the light source 5. With the first light detection unit 14, the second light detection unit 24, the first cladding mode stripper 15, and the second cladding mode stripper 25 being disposed in this manner, at least a part of the cladding mode light propagating from the upstream side to the downstream side is emitted to the outside of the second optical fiber 20 by the second cladding mode stripper 25 before the second light detection unit 24. Furthermore, at least a part of the cladding mode light propagating from the downstream side to the upstream side is emitted to the outside of the first optical fiber 10 by the first cladding mode stripper 15 before the first light detection unit 14. Therefore, the first light detection unit 14 can more accurately detect the intensity of light propagating through the first core 11, and the second light detection unit 24 can more accurately detect the intensity of light propagating through the second core 21.

Furthermore, in the light detection device 2 according to one or more embodiments, no dopant is added to the first core 11 and the second core 21, whereby occurrence of an error in the detection results of the first light detection unit 14 and the second light detection unit 24 due to concentration distribution of the dopant can be suppressed.

Furthermore, in the light detection device 2 according to one or more embodiments, the first cladding 12 is coated with the low refractive index resin layer 31 at the portion from the connection 30 between the first optical fiber 10 and the second optical fiber 20 to the first cladding mode stripper 15. With the first cladding 12 being coated with the low refractive index resin layer 31 in this manner, in the vicinity of the connection 30, leakage of the cladding mode light generated in the connection 30 and propagating in the reverse direction is suppressed, and the cladding mode light can propagate to the first cladding mode stripper 15. Furthermore, in the light detection device 2 according to one or more embodiments, the second cladding 22 is also coated with the low refractive index resin layer 31 at the portion between the connection 30 and the second cladding mode stripper 25. With the second cladding 22 being coated with the low refractive index resin layer 31 in this manner, in the vicinity of the connection 30, leakage of the cladding mode light generated in the connection 30 and propagating in the forward direction is suppressed, and the cladding mode light can propagate to the second cladding mode stripper 25. With the leakage of light in the vicinity of the connection 30 being suppressed in this manner, heat generation in the vicinity of the connection 30 is suppressed, and a change in the amount of light loss at the connection 30 can be suppressed. Therefore, the first light detection unit 14 and the second light detection unit 24 can more accurately detect the light intensity.

Furthermore, in the light detection device 2 according to one or more embodiments, the mode scrambler 35 is formed on the second optical fiber 20, and the light propagating in the multimode scatters in the second core 21. Therefore, in the second core 21, a difference in energy density distribution of the propagating light can be reduced. Accordingly, a difference in the amount of loss due to the angle of the propagating light can be reduced at the connection between the second core 21 and the first core 11. Therefore, variation in the detection results of the first light detection unit 14 and the second light detection unit 24 can be suppressed.

Furthermore, the laser device 1 according to one or more embodiments includes the light detection device 2, and the light source 5 that emits light to propagate through the first optical fiber 10 and the second optical fiber 20. As described above, with the light detection device 2, it becomes possible to improve detection accuracy of the intensity of respective light beams bidirectionally propagating through the optical fiber. Therefore, according to the laser device 1 including the light detection device 2, it becomes possible to improve accuracy in control based on the intensity of light propagating through the optical fiber.

Although the present invention has been described using the above embodiments as an example, the present invention is not limited thereto. For example, although an exemplary case where the second optical fiber 20 includes the second cladding mode stripper 25 has been described in the above embodiments, the second cladding mode stripper 25 is not an essential component. However, with the second cladding mode stripper 25 being included in the second optical fiber 20, the intensity of light propagating through the optical fiber can be more accurately detected as will be described below. In a case where the cladding mode light propagating through the second cladding 22 is not removed, at least a part of the cladding mode light propagating from the second cladding 22 to the side of the first cladding 12 can propagate through the first cladding 12. Therefore, with the second cladding mode stripper 25 being included in the second optical fiber 20, the cladding mode light propagating through the second cladding 22 is reduced, and the cladding mode light propagating through the first cladding 12 can also be reduced. Furthermore, as described above, the first light detection unit 14 detects Rayleigh scattering of light propagating through the first core 11 and the first cladding 12, and the second light detection unit 24 detects Rayleigh scattering of light propagating through the second core 21 and the second cladding 22. Since the cladding mode light propagating through the second cladding 22 and the first cladding 12 can be reduced as described above, the influence on detection results of the first light detection unit 14 and the second light detection unit 24 exerted by the cladding mode light is suppressed, and the intensity of light propagating through the first core 11 or the second core 21 can be more accurately detected. Since the degree of Rayleigh scattering differs between the light propagating through the core of the optical fiber and the cladding mode light, the cladding mode light is reduced and the Rayleigh scattering of the light propagating through the core is detected, whereby the intensity of the light propagating through the optical fiber can be more accurately detected.

Figure 3:
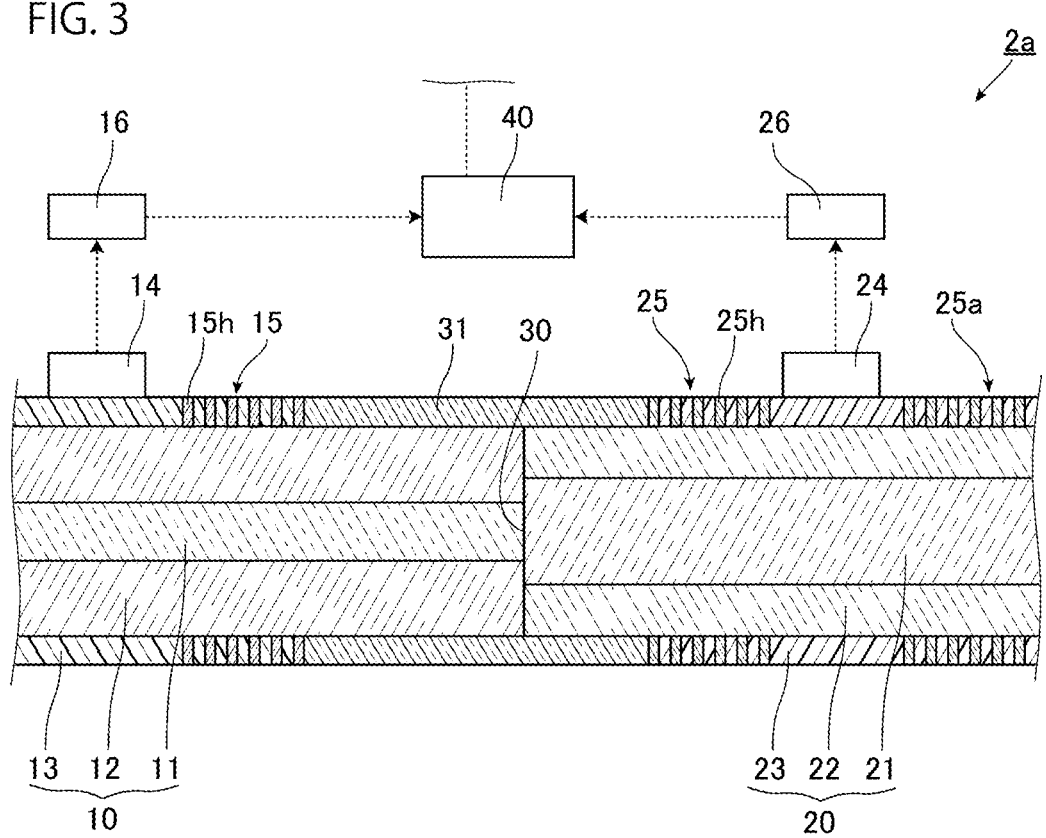
FIG. 3 is a cross-sectional view schematically illustrating a part of a light detection device according to a variation of the present invention.

Furthermore, as illustrated in FIG. 3, another cladding mode stripper 25*a* may be further provided on the downstream side of the second light detection unit 24. FIG. is a cross-sectional view schematically illustrating a part of a light detection device 2*a* according to a variation of one or more embodiments of the present invention. In the present variation, components similar to those in the embodiments described above are denoted by the same reference signs, and detailed descriptions thereof will be omitted. A part of the reflected light, which is emitted from the second optical fiber 20 and returns to the second optical fiber 20, may be cladding mode light. With the other cladding mode stripper 25*a* also being provided on the downstream side of the second light detection unit 24, such cladding mode light caused by the reflected light can be removed before the second light detection unit 24, whereby the detection result of the second light detection unit 24 can be further improved.

Figure 4:
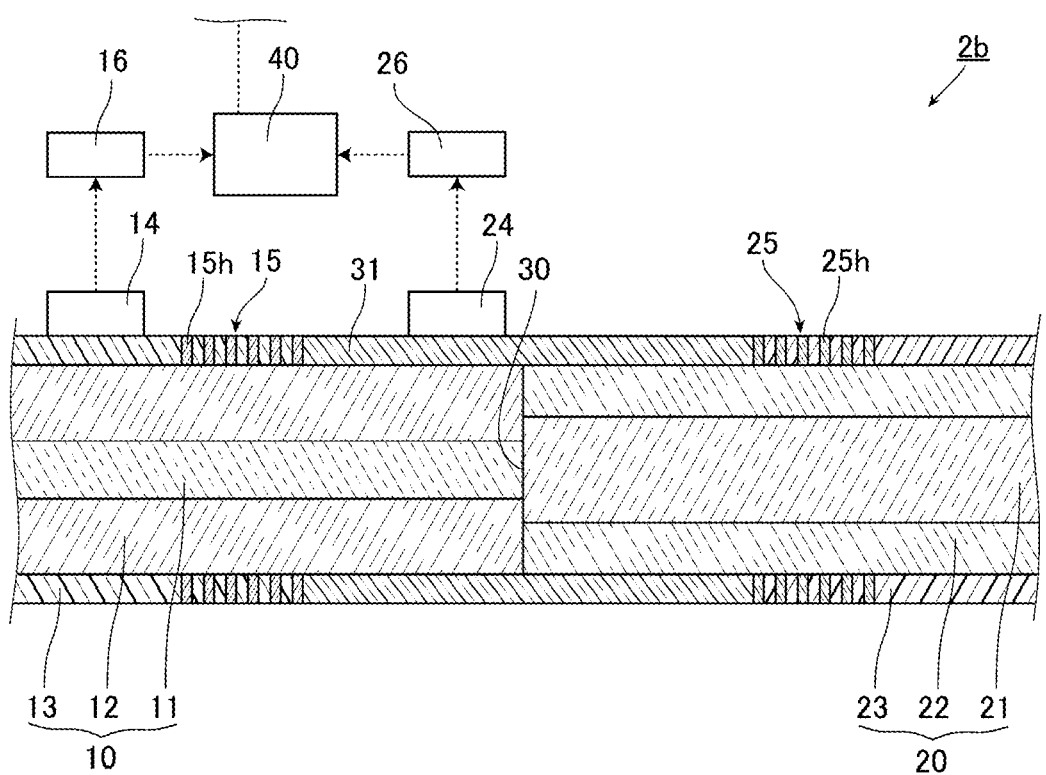
FIG. 4 is a cross-sectional view schematically illustrating a part of a light detection device according to another variation of the present invention.

Furthermore, although an exemplary case where the first light detection unit 14 is provided outside the first optical fiber 10 and the second optical fiber 20 is provided outside the second light detection unit 24 has been described in the embodiments above, the present invention is not limited to the mode. FIG. 4 is a cross-sectional view schematically illustrating a part of a light detection device 2*b* according to another variation of one or more embodiments of the present invention. In the present variation, components similar to those in the embodiments described above are denoted by the same reference signs, and detailed descriptions thereof will be omitted. The first light detection unit 14 and the second light detection unit 24 only need to be disposed to sandwich the first cladding mode stripper 15, and as illustrated in FIG. 4, both of the first light detection unit 14 and the second light detection unit 24 may be provided outside the first optical fiber 10. However, the first light detection unit 14 and the second light detection unit 24 may be disposed to sandwich the connection 30 between the first optical fiber 10 and the second optical fiber 20 as in the embodiments described above. As described above, the light detection device 2 utilizes a difference between the detection result of the first light detection unit 14 obtained and the detection result of the second light detection unit 24, caused by removing, using the first cladding mode stripper 15, cladding mode light generated at the connection 30 between the first optical fiber 10 and the second optical fiber 20. Incidentally, since there is a difference in additive concentration between the cladding and the core, the ratio of Rayleigh scattering differs between light propagating through the core and light propagating through the cladding. Therefore, each of the first light detection unit 14 and the second light detection unit 24 may detect Rayleigh scattering of light propagating through either the core or the cladding. Here, since the second core 21 has a relatively large diameter than the first core 11, the light propagating from the first core 11 to the side of the second core 21 propagates through the second core 21 with the loss at the connection 30 being suppressed. Meanwhile, at least a part of the light propagating from the second core 21 to the side of the first core 11 is made incident on the first cladding 12 at the connection 30 as described above. However, at least a part of the light incident on the first cladding 12 in this manner is emitted to outside by the first cladding mode stripper 15 before the first light detection unit 14. Accordingly, with the first light detection unit 14 and the second light detection unit 24 being disposed to sandwich the connection 30, the first light detection unit 14 mainly detects Rayleigh scattering of the light propagating through the first core 11, and the second light detection unit 24 mainly detects Rayleigh scattering of the light propagating through the second core 21. In this manner, each of the first light detection unit 14 and the second light detection unit 24 mainly detects Rayleigh scattering of light propagating through the core, whereby detection accuracy of the intensity of respective light beams bidirectionally propagating through the optical fiber can be further improved.

Although an exemplary case where both of the first optical fiber 10 and the second optical fiber 20 are multimode fibers has been described in the embodiments above, it is sufficient if at least one of the first optical fiber 10 and the second optical fiber 20 propagates light in a multimode. However, since light propagates in the multimode through at least the second core 21 out of the relatively small first core 11 and the relatively large second core 21, at the connection between the second core and the first core 11, it becomes easier to make the light propagating through the second core 21 incident on the first cladding 12. Accordingly, it becomes easier to increase the difference between the detection result of the first light detection unit 14 and the detection result of the second light detection unit 24, whereby the detection accuracy of respective light beams bidirectionally propagating through the optical fiber can be further improved. Furthermore, from the viewpoint of suppressing a decrease in the transmittance of light propagating in the forward direction, at least the optical fiber disposed on the downstream side in the forward direction may be a multimode fiber.

Furthermore, although an exemplary case where the second optical fiber 20 is on the downstream side of the first optical fiber 10 has been described in the embodiments above, the second optical fiber 20 may be on the upstream side of the first optical fiber 10.

Furthermore, although an exemplary case where no dopant is added to the first core 11 and the second core 21 has been described in the embodiments above, a dopant or the like that increases the refractive index, such as germanium, may be added to the first core 11 and the second core 21.

Furthermore, although an exemplary case where the second optical fiber 20 includes the mode scrambler 35 has been described in the embodiments above, the mode scrambler 35 is not an essential component. In the case where the mode scrambler 35 is provided, the mode scrambler 35 is not limited to the mode in which the optical fiber is bent in an annular shape as in the embodiments described above, and for example, the optical fiber may be bent in a helical or wavy manner to form the mode scrambler 35.

Furthermore, although an exemplary case where the light source 5 is a fiber laser device of a resonator type has been described in the embodiments above, the light source 5 may be another fiber laser device or a solid-state laser device. In the case where the light source 5 is a fiber laser device, it may be a fiber laser device of a master oscillator power amplifier (MO-PA) type. In addition, the number of the light sources 5 is not particularly limited, and it is sufficient if at least one light source is provided.

As described above, according to one or more embodiments of the present invention, a light detection device and a laser device that can improve detection accuracy of light bidirectionally propagating through an optical fiber is provided, which are expected to be utilized in the fields of fiber laser devices and optical fiber communication.

REFERENCE SIGNS LIST 1 laser device
2, 2a, 2b light detection device
5 light source
10 first optical fiber
11 first core
12 first cladding
14 first light detection unit
15 first cladding mode stripper
16 first AD converter
20 second optical fiber
21 second core
22 second cladding
24 second light detection unit
25 second cladding mode stripper
26 second AD converter
30 connection
31 low refractive index resin layer
35 mode scrambler
40 calculator
CP control unit Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A light detection device comprising:
   a first optical fiber including a first core surrounded by a first cladding;
   a second optical fiber including a second core surrounded by a second cladding, wherein the second core has a diameter larger than a diameter of the first core and is connected to the first core;
   a first cladding mode stripper provided outside the first cladding;
   a first light detector; and
   a second light detector, wherein
   in a longitudinal direction of the first optical fiber, the first light detector is disposed on one side of the first cladding mode stripper and the second light detector is disposed on another side of the first cladding mode stripper,
   the first light detector detects Rayleigh scattering of light that propagates through the first core,
   the second light detector detects Rayleigh scattering of light that propagates through the first core or the second core, and
   at least one of the first optical fiber and the second optical fiber is a multimode fiber.

2. The light detection device according to claim 1, wherein the second optical fiber is the multimode fiber.

3. The light detection device according to claim 1, wherein
   in the longitudinal direction of the first optical fiber and the second optical fiber, the first light detector and the second light detector are disposed such that a connection between the first optical fiber and the second optical fiber is sandwiched between the first light detector and the second light detector, and
   the second light detector detects the Rayleigh scattering of light propagating through the second optical fiber.

4. The light detection device according to claim 1, wherein
   the second optical fiber is disposed on a downstream side of the first optical fiber in a propagation direction of light emitted from a light source such that the light is emitted to propagate through the first optical fiber and the second optical fiber.

5. The light detection device according to claim 1, wherein a second cladding mode stripper is provided outside the second cladding.

6. The light detection device according to claim 5, wherein
   the first light detector is disposed on a side opposite to a side of the second optical fiber with respect to the first cladding mode stripper, and
   the second light detector is disposed on a side opposite to a side of the first optical fiber with respect to the second cladding mode stripper.

7. The light detection device according to claim 1, wherein no dopant is added to the first core and the second core.

8. The light detection device according to claim 1, wherein the first cladding is coated, with a low refractive index resin having a refractive index lower than a refractive index of the first cladding, at a portion of the first cladding from a connection between the first optical fiber and the second optical fiber to the first cladding mode stripper.

9. The light detection device according to claim 1, wherein an outer diameter of the first cladding and an outer diameter of the second cladding are equal to one another.

10. The light detection device according to claim 1, further comprising:
   a mode scrambler that reduces an energy difference between light beams of respective modes propagating in a core of whichever is the multimode fiber between the first optical fiber and the second optical fiber.

11. A laser device comprising:
   the light detection device according to claim 1; and
   at least one light source that emits light that propagates through the first optical fiber and the second optical fiber.

12. The light detection device according to claim 1, wherein the first light detector and the second light detector are disposed apart from the first cladding mode stripper.

* * * * *